US009479085B1

(12) United States Patent
Ludois et al.

(10) Patent No.: US 9,479,085 B1
(45) Date of Patent: Oct. 25, 2016

(54) SELF-CONFORMING PLATES FOR CAPACITIVE MACHINES SUCH AS ELECTROSTATIC MOTORS AND GENERATORS

(71) Applicant: C-Motive Technologies, Inc., Madison, WI (US)

(72) Inventors: Daniel Colin Ludois, Madison, WI (US); Micah Jon Erickson, San Francisco, CA (US)

(73) Assignee: C-Motive Technologies Inc., Madison, WI (US)

( * ) Notice: Subject to any disclaimer, the term of this patent is extended or adjusted under 35 U.S.C. 154(b) by 441 days.

(21) Appl. No.: 14/026,281

(22) Filed: Sep. 13, 2013

Related U.S. Application Data (60) Provisional application No. 61/701,607, filed on Sep. 15, 2012.

(51) Int. Cl.
*H02N 1/00* (2006.01)
*H02N 1/08* (2006.01)

(52) U.S. Cl.
CPC ............. *H02N 1/006* (2013.01); *H02N 1/08* (2013.01)

(58) Field of Classification Search
CPC ........... H02N 1/00; H02N 1/08; H02N 1/002
USPC ........................................ 310/300, 308, 309
See application file for complete search history.

(56) References Cited

U.S. PATENT DOCUMENTS

| 2,710,371 | A | | 6/1955 | Baensch |
| 2,722,652 | A | | 11/1955 | Brainard |
| 3,013,201 | A | | 12/1961 | Goldie |
| 3,696,258 | A | * | 10/1972 | Anderson ............... G04C 3/16 310/10 |

(Continued)

FOREIGN PATENT DOCUMENTS

| GB | 1437785 | 3/1966 |
| GB | 1021669 | 6/1976 |

OTHER PUBLICATIONS

Colgate, J. Edward; Matsumoto, Hirofumi; and Wannasuphoprasit, Witaya; "Linear Electrostatic Actuators Gap Maintenance Via Fluid Bearings"; Book: Robotics & Computer-Integrated Manufacturing, 1993, vol. 10, No. 5, pp. 365-376, Great Britain.

(Continued)

*Primary Examiner* — Hanh Nguyen
(74) *Attorney, Agent, or Firm* — Craig A. Fieschko, Esq.; DeWitt Ross & Stevens S.C.

(57) ABSTRACT

Capacitive machines generate torque, generate electric power, and/or transmit electrical signals using closely spaced parallel plates wherein one plate is in motion relative to the other. Closer plate spacing, and thus greater power capacity, is obtained by defining flexures at or near the locations where the plates are anchored to their actuators or mountings, and by defining walls which obstruct fluid flow between one or more of the plates. As one plate is set in motion parallel to the other, thereby inducing fluid flow between the plates, the flow generates a fluid pressure distribution which tends to maintain the plates in spaced relation. In response to the pressure, the flexures allow the plates—which may be out of parallel—to displace and/or tilt from their nominal positions into close parallel relation, thereby providing better capacitance (and thus better torque/power/signal transmission).

23 Claims, 10 Drawing Sheets

(56) References Cited

U.S. PATENT DOCUMENTS

| | | | | |
|---|---|---|---|---|
| 4,127,804 | A | * 11/1978 | Breaux | H02N 1/08 310/308 |
| 4,754,185 | A | * 6/1988 | Gabriel | H02N 1/004 310/309 |
| 5,477,097 | A | 12/1995 | Matsumoto | |
| 7,239,065 | B2 | * 7/2007 | Horst | H02N 1/004 310/309 |
| 7,304,410 | B2 | 12/2007 | Odaka et al. | |
| 7,372,186 | B2 | * 5/2008 | Odaka | H02N 1/004 310/309 |
| 7,459,823 | B1 | 12/2008 | Kerlin | |
| 7,851,967 | B2 | 12/2010 | Matsubara et al. | |
| 2010/0194236 | A1 | 8/2010 | Verkoglyad et al. | |
| 2013/0043762 | A1 | 2/2013 | Ludois et al. | |
| 2013/0106317 | A1 | 5/2013 | Ludois | |

OTHER PUBLICATIONS

Liu, C. et al., Steady State Analysis of a Capacitively Coupled Contactless Power Transfer System, Energy Conversion Congress and Exposition, 2009, ECCE 1009, pp. 3233-3238, IEEE, Piscataway, NJ, USA.

Liu C., Power Flow Control of a Capacitively Coupled Contactless Power Transfer System, Industrial Electronics, 2009, IECON '09, 35$^{th}$ Annual Conference of IEEE, Nov. 3-5, 2009, pp. 743-747, IEEE, Piscataway, NJ, USA.

Liu, C. et al., Coupling Study of a Rotary Capacitive Power Transfer System, ICIT '09 Proceedings of the 2009 IEEE International Conference on Industrial Technology, IEEE Computer Society Washington, DC, USA.

Philp, S.F., The Vacuum-Insulated Varying-Capacitance Machine, IEEE Transactions on Electrical Insulation, pp. 130-136, vol. E1012, No. 2, Apr. 1977, IEEE, New York, New York, USA.

O'Donnell, R.J. et al., The Variable-Capacitance Machine for Offshore Wind Generation, pp. 131-135, Proceedings of the 3$^{rd}$ IET International Conference on Power Electronics, Machines and Drives, 2006, The Institute of Engineering and Technology, Stevenage Hertfordshire, United Kingdom.

O'Donnell, R. et al., Design concepts for High-Voltage Variable-Capacitance DC Generators, pp. 1778-1794, IEEE Transactions on Industry Applications, vol. 45, No. 5, Sep./Oct. 2009, IEEE, New York, New York, USA.

* cited by examiner

SELF-CONFORMING PLATES FOR CAPACITIVE MACHINES SUCH AS ELECTROSTATIC MOTORS AND GENERATORS

CROSS-REFERENCE TO RELATED APPLICATIONS

This application claims priority under 35 USC §119(e) to U.S. Provisional Patent Application 61/701,607 filed 15 Sep. 2012, the entirety of which is incorporated by reference herein.

FIELD OF THE INVENTION

This document concerns an invention relating generally to capacitive machines, e.g., electrostatic motors, and more specifically to capacitive machines having parallel plates which self-conform during machine operation to maintain a parallel spaced relationship between plates.

BACKGROUND OF THE INVENTION

Figure 1A:
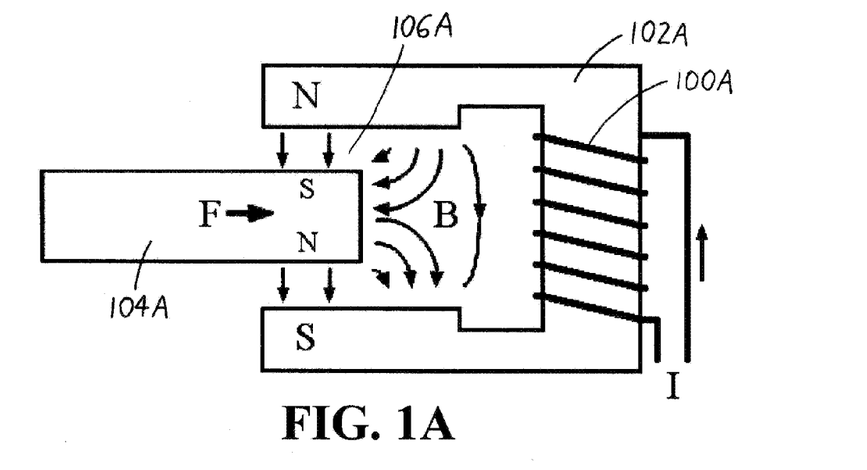
FIG. 1A is a simplified schematic depiction of an inductive (electromagnetic) actuator.

Common electric motors and/or generators operate on electromagnetic principles, and use magnetic fields from permanent magnets and/or wound-wire electromagnets to generate current or mechanical motion. A simple example of this principle is shown in FIG. 1A, where a coil 100A carrying current I winds about a U-shaped "core" 102A made of iron (or another ferromagnetic material, i.e., one which is magnetizable), and which has an iron (or other ferromagnetic) post 104A situated within the core. The current converts the core 102A into an electromagnet with magnetic flux density B, pulling the post 104A rightwardly into the gap 106A with F reluctant force. Thus, electric power causes mechanical motion. Conversely, mechanical motion can be converted to electric power: if current I is not supplied (and if post 104A is a magnet), pulling the post 104A away from the electromagnet 102A generates current I at the terminals of the coil 100A (assuming the terminals are connected to form a closed circuit). Common motors and generators use this concept by (for example) providing a series of coils about a ferromagnetic rotor (with the coils having axes which intersect at the rotor), and energizing the coils in sequence to spin the rotor (or spinning the rotor to generate electricity from the coils). Machines of this nature can be referred to as electromagnetic motors and generators, or more simply as inductive machines ("induction" referring to the generation of a magnetic field upon application of current). Inductive machines can also take the form of devices other than motors and generators; for example, electrical signals (e.g., data and/or power) can be transferred between parts, such as opposing coils, using magnetic fields.

Figure 1B:
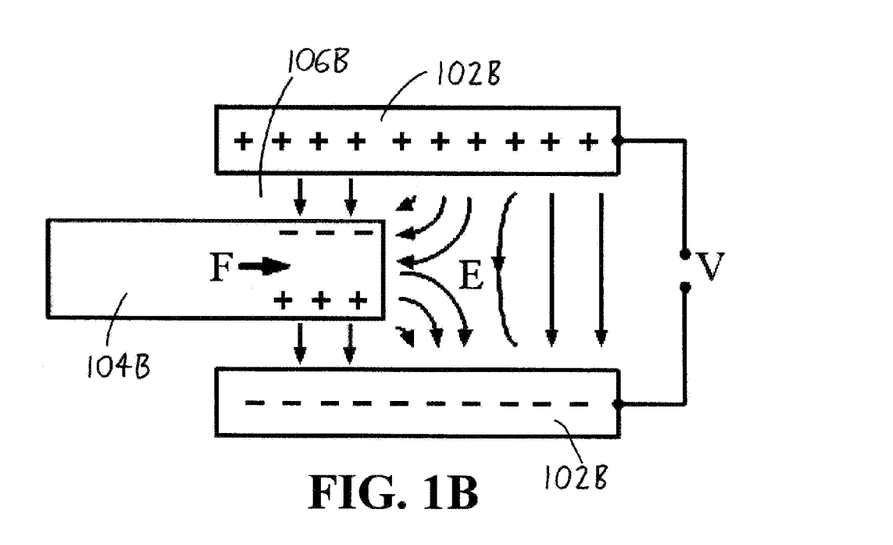
FIG. 1B is a simplified schematic depiction of a capacitive (electrostatic or electrodynamic) actuator.

Less well known are electrostatic (or electrodynamic) motors and generators, which can also be referred to as capacitive machines. These are devices that produce motion from electrical input, produce electricity from motion input, and/or transfer electrical signals (e.g., data and/or power) between parts, by using capacitance (the ability of a system to store electric charge) rather than induction. Stated differently, charge is moved by electric fields in capacitive machines, whereas charge is moved by magnetic fields in inductive machines. In simpler terms, capacitive machines rely on the "static cling" force that holds clothing together when it's pulled from a clothes dryer, whereas inductive machines rely on the magnetic force that holds magnets to iron. FIG. 1B illustrates a capacitive version of the inductive machine of FIG. 1A, wherein two fixed parallel conducting plates 102B are separated by an electrically isolating gap 106B. The plates 102B are connected to a voltage source to create electric field E between them. Pulling a conductive plate 104B through the gap 106B with force F generates electricity because the electric field induces an electric charge on the surface of the movable plate 104B, as well as exerting a force to move the plate 104B rightward. Thus, electric power causes mechanical motion. As with an electromagnetic system, if an external force can overcome F, the mechanical motion will generate electric power. Similarly to the electromagnetic system of FIG. 1A, this translational motion may be transformed into rotational motion. For example, a number of sets of parallel plates (like the plates 102B) might be arrayed along a circular path, and might have a rotor mounted to rotate about a shaft, with the rotor having arms (like the plate 104B) situated to travel between the parallel plates as the rotor rotates. If the parallel plates are sequentially charged, the arms of the rotor can be pulled about the circular path, converting electric power to mechanical motion. This capacitive machine may also be "run in reverse," with rotation of the rotor generating electrical output. Desired levels of output torque or electric power can be generated by stacking further plates in the circular parallel array, and by connecting further rotors to the shaft. Capacitive machines of this nature hypothetically have a number of advantages over inductive machines, including reducing or eliminating the cost, bulk, and weight of magnets, ferrous materials, and low resistance copper windings. Moreover, the reduction in bulk and weight should have the secondary effect of allowing higher-speed operation. Higher electrical efficiencies should also be possible because capacitive machinery operates best at higher voltages, which typically provides lower conduction losses.

Despite the foregoing, capacitive machines are presently rarely used. This is in large part owing to the relatively low capacitive coupling that can practically be obtained between the moving and stationary plates of practical capacitive machines, resulting in low power density. Ideally, plates should be spaced as closely as possible in parallel relationship for greater capacitance (and thus greater power density), but practical difficulties limit plate spacings and parallel alignments: it is difficult to attain close (ideally micron-level) spacings between plates having large area, which is also beneficial for power density, and small thickness, which is beneficial for weight and speed, particularly owing to plate flexure. External influences such as temperature, vibrations, shaft end play, orientation (gravity), etc. can readily result in plate-to-plate contact and damage to (or destruction of) a capacitive machine, particularly at high operating speeds. The problem grows more acute as additional parallel plates are added to attain preferred power densities.

SUMMARY OF THE INVENTION

The invention involves capacitive machines which are intended to at least partially solve the aforementioned problems. To give the reader a basic understanding of some of the advantageous features of the machines, following is a brief summary of preferred versions of the machines, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the machines in which exclusive rights are secured.

Figure 2A:
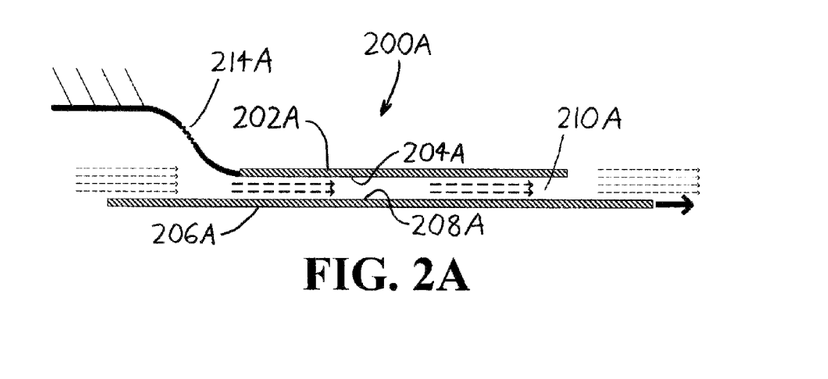
FIG. 2A depicts a simplified cross-sectional schematic view of a translational capacitive machine 200A, wherein the second plate 206A translates adjacent the first plate 202A, with flow of fluid 210A maintaining the plates 202A and 206A apart.
Figure 2B:
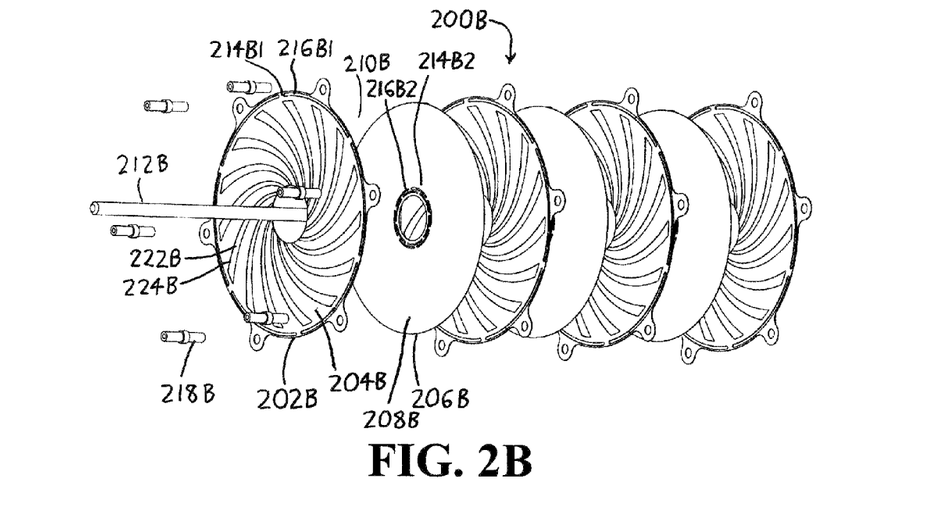
FIG. 2B depicts a simplified "exploded" (disassembled) view of a rotational capacitive machine 200B, wherein the second plate 206B rotates adjacent the stationary first plate 202B, with flow of fluid 210B maintaining the plates 202B and 206B apart (aided by the fluid flow channels 222B) with the flexure regions 214B1 and 214B2 allowing the first and second plates 202B and 206B to deflect into closely spaced parallel relation.

Looking initially to FIGS. 2A and 2B for simplified views of exemplary capacitive machines 200A and 200B, each machine includes a first plate 202A/202B having a first plate face 204A/204B, and a second plate 206A/206B having a second plate face 208A/208B which is closely spaced opposite the first plate face 204A/204B and oriented parallel to the first plate face 204A/204B, with the first and second plate faces 204A/204B and 208A/208B having a gap 210A/210B containing insulating fluid (e.g., air or oil) therebetween. In the machine 200A of FIG. 2A, the second plate 206A is constrained (e.g., by a linear actuator, not shown) to translationally move along a linear travel direction with respect to the first plate 202A, whereas in the machine 200B of FIG. 2B, the second plate 206B is constrained (e.g., by an actuator in the form of an axial rotating shaft 212B) to rotationally move along a circumferential direction with respect to the first plate 202B (i.e., along an arc curving about an axis, here along a path orbiting an axis of rotation). Such motion causes flow of the fluid between the plates 202A/202B and 206A/206B, with the moving second plate 206A/206B pulling fluid in the travel direction via boundary layer effects (arising from friction, viscosity, etc.). In the machine 200A of FIG. 2A, this creates fluid flow along the translational travel direction of the second plate 206A, whereas in FIG. 2B, this creates fluid flow along both the rotational travel direction of the rotating second plate 206B, as well as in a radial direction owing to centrifugal effects (as in a Tesla turbine). As fluid is pulled between the plates 202A/202B and 206A/206B by the moving plate 206A/206B, the fluid urges the plates 202A/202B and 206A/206B apart, thereby helping to maintain the desired gap 210A/210B between the plates 202A/202B and 206A/206B.

At least one of the plates 202A/202B and 206A/206B has discontinuities in the relief of its plate face 204A/208A/204B/208B to assist in maintaining the plates in closely spaced parallel relation. (Here the term "relief" has generally the same meaning it has in the topographic sense, when referring to an elevation change along a landscape. Thus, when it is said that a plate has discontinuities in the relief of its plate face, this means that the local elevation of the plate face changes, e.g., falls to define a valley, or rises to define a plateau.) Each discontinuity defines at least one of a flexure region and a wall which obstructs fluid flow, with each of these arrangements being discussed in greater detail below.

A flexure region on a plate has greater flexibility than regions of the plate outside the flexure region, whereby the plate is more easily deflected at the flexure region along directions oriented generally perpendicularly with respect to the travel direction. A preferred arrangement for such a flexure region is illustrated in FIG. 2B, wherein flexure regions 214B1 are defined by slits 216B1 in the stationary first plates 202B which are each situated between a stator mount 218B and the major portion of their plates 202B, and by slits 216B2 in the rotating second plates 206B which are closely spaced to each other on each plate 206B in parallel relation (preferably with their lengths staggered). At each flexure region 214B1/214B2, the plate 202B or 206B is more easily deflected in directions oriented generally perpendicular to the slits 216B1/216B2, e.g., the annular regions of the first (stator) plates 202B situated radially within the slits 216B1 in FIG. 2B can deflect (displace and/or tilt) into planes parallel or oblique to the portions of the first plates 202B situated radially outside the slits 216B1.

These first plates 202B are preferably mounted in fixed relation to each other by one or more stator mounts 218B at their outer circumferences (with the stator mounts here being provided in the form of pins/bolts extending through stator mounting holes), and thus placement of the flexure regions 214B1 near the outer circumferences of the first plates 202B allows a major portion of each plate 202B to deflect with respect to its adjacent stator mount 218B. Similarly, the second (rotor) plates 206B bear slits 216B2 adjacent to their central actuating shaft 212B such that the annular regions of the second (rotor) plates 206B situated radially outside the slits 216B2 in FIG. 2B can deflect into planes parallel or oblique to the portions of the second plates 206B situated radially inside the slits 216B2. Such flexure regions 214B1/214B2 are useful because they can complement the effect of flow-induced spacing of the plates 202B and 206B, i.e., the spacing of the plates 202B and 206B owing to the "pumping" of fluid therebetween by the moving plate 206B. If the plates 202B and 206B should happen to be misaligned such that they are not at least substantially parallel, owing to vibration, shaft end play, temperature, orientation/gravity, or other factors, the plates 202B and 206B (or at least major portions thereof) can deflect to "self-align" into parallel (or nearly so) relationship as the spring force of the flexure regions 214B1/214B2 offsets the pressure of the flowing fluid. By maintaining the plates 202B and 206B in parallel close relation, capacitive coupling (and thus power density) is maximized Flexure regions can also be incorporated in the arrangement of FIG. 2A, as exemplified by flexure region 214A.

Figure 3:
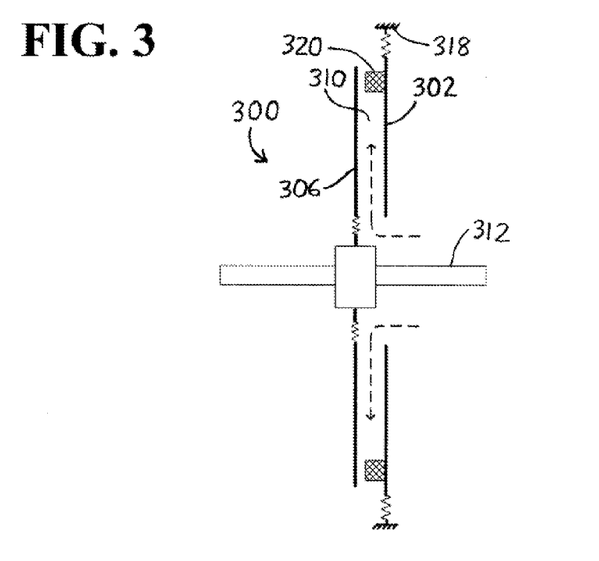
FIG. 3 depicts a simplified cross-sectional schematic view of a rotational capacitive machine 300 similar to that of FIG. 2B, wherein the second plate 306 rotates adjacent the stationary first plate 302, and wherein the wall 320 (in the form of an annular ring) adapts the rotation-induced flow of fluid 310 (and thus the fluid pressure) between the plates 302 and 306.

As noted above, a plate can optionally or additionally include a wall which is situated to obstruct fluid driven to flow between the plates due to plate motion. Such a wall can be configured to tailor fluid pressure between the plates to attain desired effects, e.g., to obtain a desired pressure distribution. As an example, FIG. 3 is a schematic cross-sectional view of a stationary first (stator) plate 302 fixed in place by a stator mount 318, and a rotating (rotor) plate 306 driven by an actuator shaft 312, wherein the first plate 302 bears a wall 320 extending in a circumferential direction, with the wall preferably being defined as an annular ring. Fluid flowing radially outwardly between the plates 302 and 306 due to plate motion is obstructed by the wall 320, maintaining higher pressure between the plates 302 and 306 and thereby better ensuring their separation. To further engineer the fluid pressure generated by the radial fluid flow, multiple annular rings might be situated at different radial locations on one or more of the plates 302 and 306 (possibly with different rings having different heights), and/or gaps/spaces may be defined in one or more of the rings, e.g., at equal spacings about the circumference of the ring.

Figure 4:
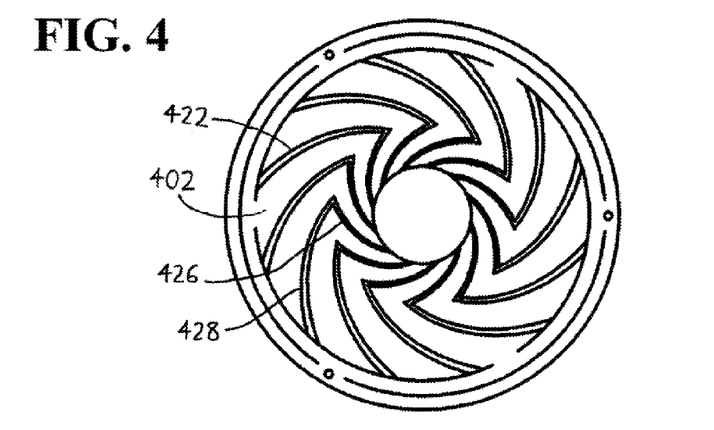
FIG. 4 depicts an exemplary stationary first plate 402 that might be used in place of the stationary first plate 202B of FIG. 2B, wherein the first and second channel sections 426 and 428 adapt the fluid flow (and thus the fluid pressure) between the stationary first plate 402 and any adjacent rotating second plate.

As another example of the use of discontinuities in plate faces to adapt fluid flow to attain desired effects, the stationary (stator) plate 202B of FIG. 2B has channels 222B defined in its plate face 204B, with the channels 222B being bounded by opposing channel walls 224B. As the channels 222B extend radially outwardly, they also extend in one of a clockwise or counterclockwise direction, assuming the shape of a Fermat's spiral (i.e., a "pinwheel" shape). The channels 222B preferably curve outwardly in the opposite direction as the rotation of the rotating plate 206B, e.g., the rotating plate 206B is intended to rotate in the clockwise direction, with the channels 222B curving in the counterclockwise direction as they extend radially outwardly. In this manner, the curvature of these channels 222B is such that they collect some of the fluid which is being rotationally driven by the rotating plate 206B, and carry the fluid toward the central actuating shaft 212B that drives the rotating plate 206B. At or near the inner diameter of the stationary plate 202B, the fluid leaves the channels 222B and is centrifugally driven outwardly between the plates 202B and 206B. The radially inwardly directed flow generated by the channels 222B helps to create higher pressure between the plates 202B and 206B, and thereby maintain the plates 202B and 206B in spaced relation as the flexure regions 214B1/214B2 (if provided) on the plates 202B and 206B help them to self-align into parallel relation. FIG. 4 illustrates a variation of this arrangement wherein each channel 422 in a stationary plate 402 includes a first channel section 426 extending in a clockwise direction as the first channel section extends radially outwardly, and a second channel section 428 extending in a counterclockwise direction as the second channel section extends radially outwardly. Here the inwardly-pumped fluid tends to escape each channel 422 near the middle of the radius of the stationary plate 402, and thereby generate higher plate-separating pressure at this region.

Figure 5A:
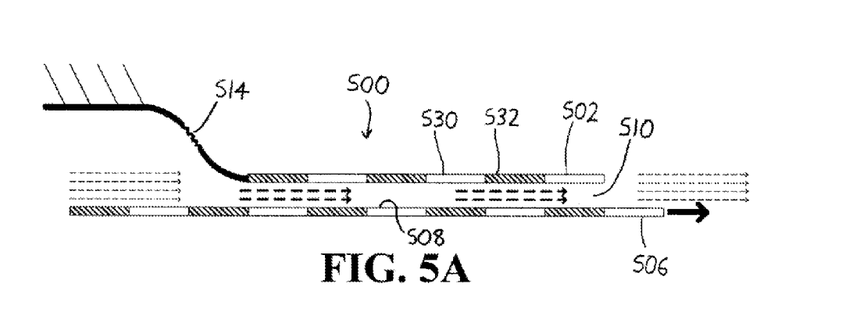
FIGS. 5A and 5B depict a simplified cross-sectional schematic view of a translational capacitive machine 500 in first and second positions, wherein the capacitive machine 200A of FIG. 2A is modified for saliency, i.e., the stationary first plate 502 and translating second plate 506 bear insulating sections 530 and conducting sections 532 so that capacitance between the plates varies as a function of the position of the second plate 506 with respect to the position of the first plate 502.
Figure 5B:
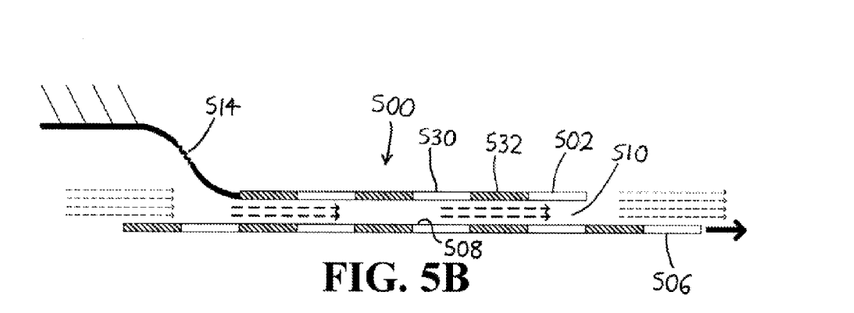
Figure 6A:
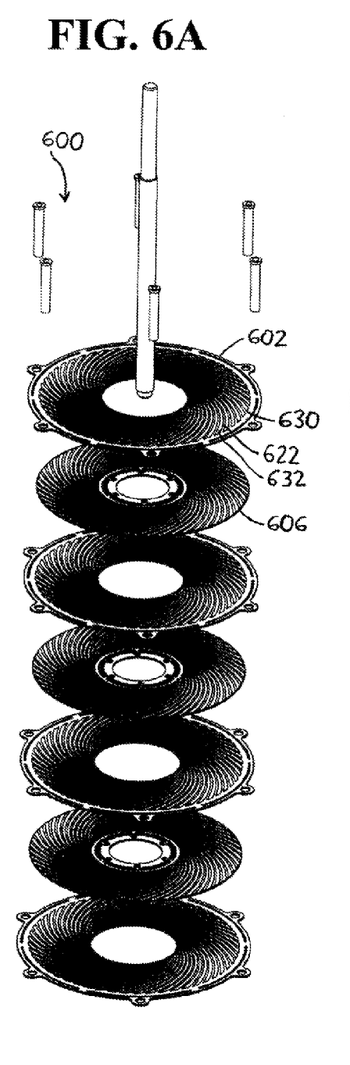
FIG. 6A depicts a simplified "exploded" (disassembled) view of a rotational capacitive machine 600 wherein the capacitive machine 200B of FIG. 2B is modified for saliency, i.e., the stationary first plate 602 and rotating second plate 606 bear insulating sections 630 and conducting sections 632 so that capacitance between the plates varies as a function of the position of the second plate 606.
Figure 6B:
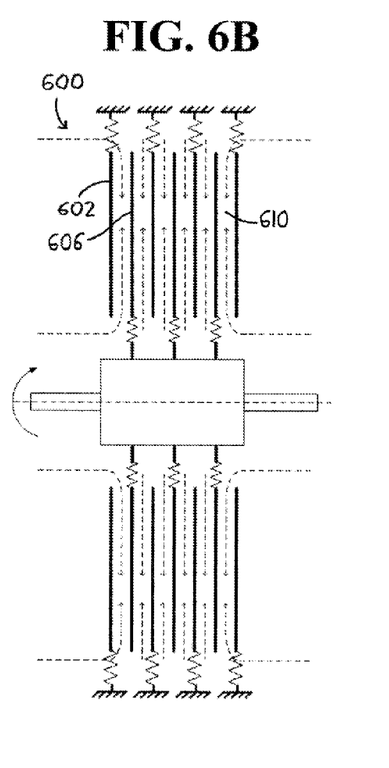
FIG. 6B then presents a simplified schematic view of the assembled machine 600 in operation, with fluid flowing in the gap 610 owing to both radially outwardly directed centrifugal forces and the radially inwardly directed "pumping" effect of the channels 622 (which are not visible in FIG. 6B).
Figure 7:
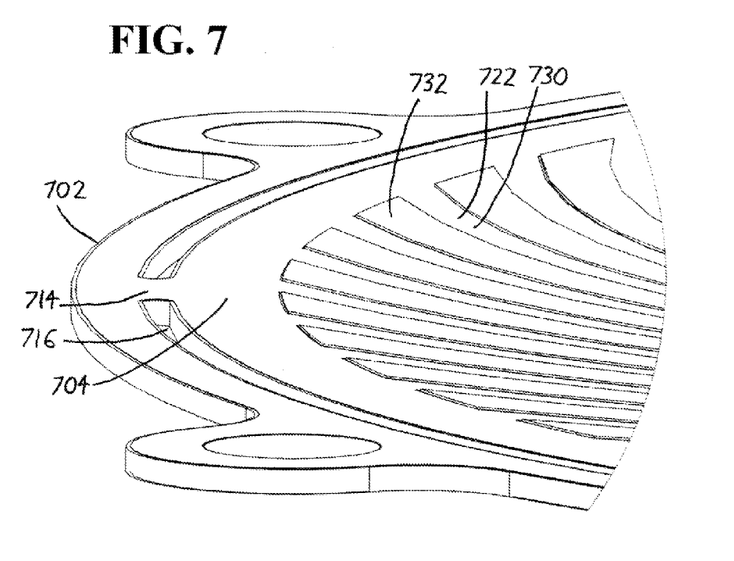
FIG. 7 depicts a perspective view of an exemplary stationary first plate 702 which might be used for the first plate 602 of the FIG. 6 arrangement, wherein the insulating sections 732 have channels 722 defined therebetween, with the channels 722 defining conducting sections 730 (and with flexure regions 714 formed by slits 716).
Figure 8:
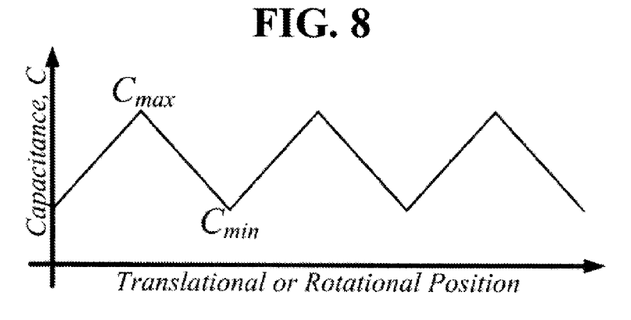
FIG. 8 provides an exemplary depiction of how capacitance between adjacent plates might vary with the angular position of a rotating second plate (such as the second plate 606 in FIG. 6)—or with the travel distance of a translating second plate (such as the second plate 506 in FIG. 5)—in a salient capacitive machine.

Capacitive machines as described above can also be provided with first and second plates which each have insulating sections spaced by conducting sections along their plate faces, with the insulating and conducting sections being arrayed along the travel direction to provide saliency (variability of capacitance as a function of position). Saliency allows electric fields within a capacitor to exert force along the travel direction, a necessary feature when a capacitive machine is to serve as a motor, and it also allows the relative position between plates to be sensed by monitoring capacitance as plate position changes. FIGS. 5A and 5B provide an exemplary capacitive machine 500 which is essentially a salient version of FIG. 2A, with insulating sections 530 and conducting sections 532 spaced along the stationary first plate 502 and moving second plate 506 (wherein the first plate 502 has flexure region 514). When the translating second plate is as in FIG. 5A with conducting sections 532 between plates being at their maximum distance apart, capacitance is at a minimum, whereas capacitance is maximized when the conducting sections 532 are aligned (as in FIG. 5B). A particularly preferred arrangement is to use the boundaries between the conducting and insulating sections to define the walls or other discontinuities used to adapt the fluid flow, and thus the fluid pressure, between the plates 502 and 506. As an example, FIG. 6A provides a variation of the arrangement of FIG. 2B wherein the regions 632 of the stationary plates 602 adjacent the channels 622 might be defined by conductive material (i.e., the channel floors might be defined of conductive material), and the regions 630 of the plates between the channels might be defined by insulating material. (Conversely, the plate regions adjacent the channels—the channel floors—might be insulating, and the plate regions between the channels might be conductive, though protruding insulating sections are preferred as these can better avoid shorting in the event faces of the plates make contact.) An arrangement of this nature is shown in greater detail in FIG. 7, wherein insulating material 732 is adhered or otherwise provided atop the conductive plate face 704 of the stationary (stator) first plate 702 so that channels 722 with conductive floors 730 are defined between insulating plateaus 732. Any adjacent rotating (rotor) plate face preferably has insulating and conducting sections which together define an at least substantially planar surface, though the rotor could instead be formed with a discontinuous surface such as the one of the stator. FIG. 8 then illustrates an exemplary relationship between rotor-stator capacitance and position that results from rotation of the rotor in a salient capacitive machine such as those of FIGS. 5-7.

Figure 9A:
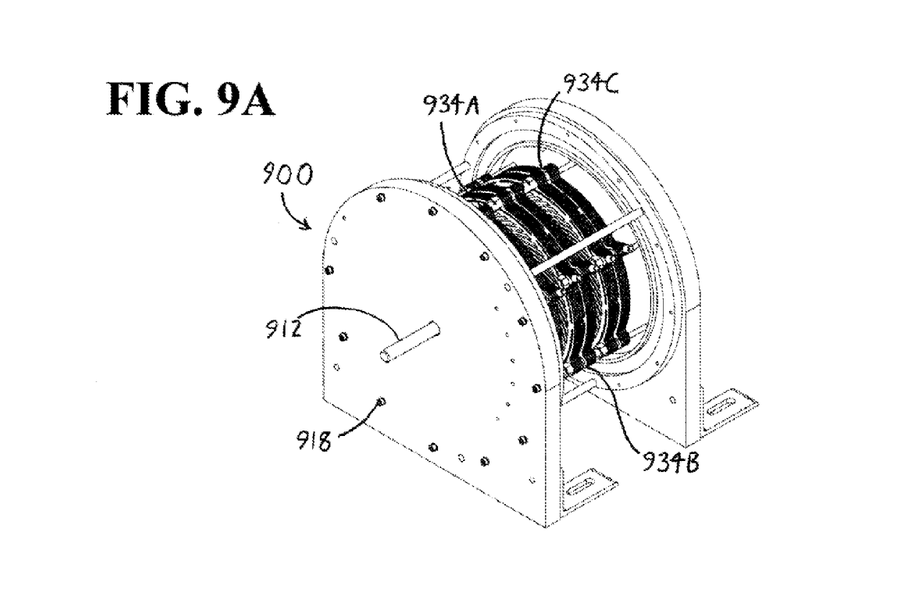
FIG. 9A provides a perspective view of an exemplary capacitive machine 900 having three sets 934A, 934B, and 934C of stationary first plates and rotating second plates, with FIG. 9B then illustrating the second plates 906 and (the bushing of) their actuator shaft 912, along with the first plates 902, in "exploded" (disassembled) form.
Figure 9B:
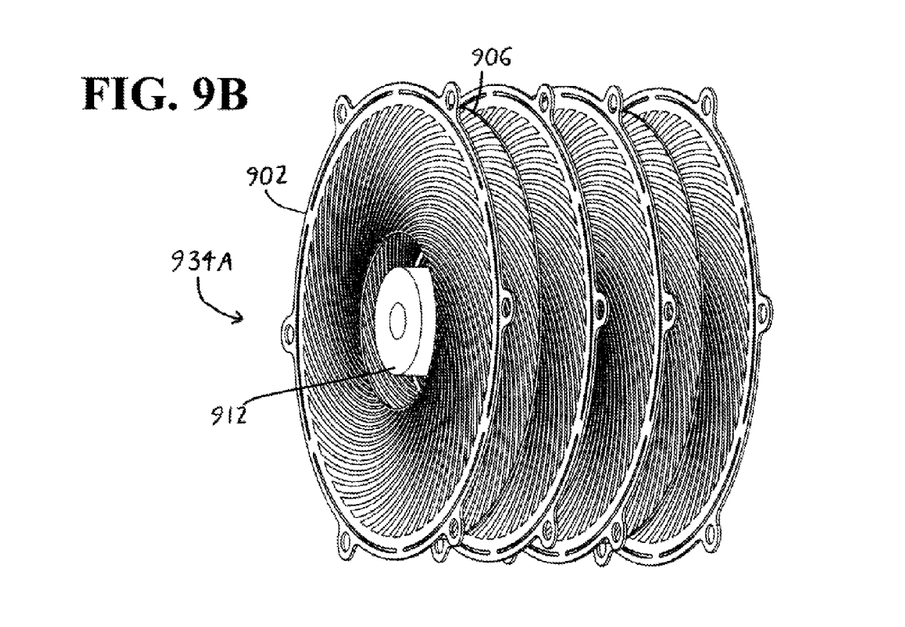
Figure 9C:
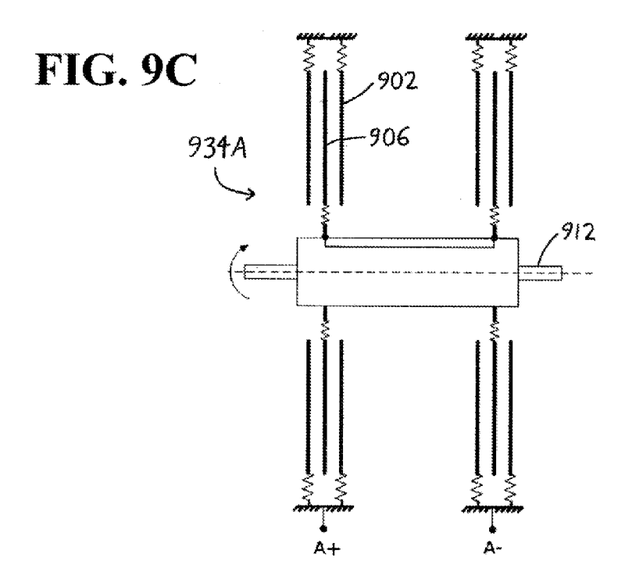
FIG. 9C providing a simplified schematic cross-sectional view of one of the plate sets 934A, 934B, and 934C.

The capacitive machines can (and preferably do) include multiple sets of plates, with plates being conductively connected to increase power density or achieve other advantages. FIGS. 9A-9C illustrate an exemplary capacitive machine 900, with the machine only partially being shown in disassembled form in FIG. 9B, and in schematic form in FIG. 9C. The machine 900 has three similarly-configured sets 934A, 934B, and 934C of first and second plates 902 and 906, with set 934A being schematically illustrated in FIG. 9C. Looking to FIG. 9C, within each set (as exemplified by set 934A), the stationary first (stator) plates 902 are fixed in position with respect to each other (e.g., via their stator mounts 918, provided in FIG. 9A as stator mount pins), and have their conducting sections connected in conductive communication with each other (as by wiring extending between the outer circumferences of the stationary plates, or conductive stator mount pins 918 extending between the conducting sections of the stationary plates). Similarly, within each set (as exemplified by set 934A of FIGS. 9B and 9C), the rotating second (rotor) plates 906 are fixed in position with respect to each other, and have their conducting sections connected in conductive communication with each other (as by having a conductive actuator shaft 912 extend between the conductive sections of the rotating second plates 906, whereby all rotating plates 906 within each set 934A, 934B, and 934C are conductively and rotatably connected). This arrangement can beneficially allow brushless operation for torque production, as implied by the simplified circuit diagram of FIG. 9D: within each set 934A, 934B, and 934C, leads from the stationary first plates 902 (labeled A+ and A−, B+ and B−, and C+ and C−) provide current without the need for a brush or other arrangement allowing current to be picked up off the rotating second plates 906.

While it is not necessary to have three plate sets 934A, 934B, and 934C in the capacitive machine 900 to achieve brushless operation—this can be achieved with only one of the plate sets 934A, 934B, and 934C—the use of three plate sets also beneficially allows multi-phase (here three-phase) operation, if desired. Here each set 934A, 934B, and 934C has salient first and second plates 902 and 906, each having plate faces with insulating sections spaced along the (circular) travel direction by conducting sections (as in FIG. 6), such that the conducting sections of each set's first and second plates 902 and 906 periodically move into alignment during motion of the second plates 906. However, the sets' conducting sections come into alignment at different times in succession, with each set's conducting sections coming into alignment some angle Θ after the prior set's conducting sections came into alignment (with Θ=360/3n, with n being the number of conducting sections situated on each rotating second plate 906). As a result, as the second plates 906 of the sets 934A, 934B, and 934C rotate, different sets achieve alignment of their conducting and insulating sections at different times, and the outputs of the different sets will differ in phase. Alternatively, where the machine 900 is run "in reverse" as a motor rather than a generator, application of an alternating current across each set's leads (with each set's AC source having a different phase) will drive the set's second plates 906 to rotate with respect to the first plates 902 within the sets, resulting in rotation of the actuating shaft 912 without the need for any brushed connection to the shaft 912. In contrast to a conventional single-phase arrangement, which doesn't generate torque at all positions of the second plates 906, the use of multiple single-phase (but differently-phased) units on a common shaft 912 allows at least one of the sets 934A, 934B, and 934C to generate torque at any point during rotation of the shaft 912.

Figure 10A:
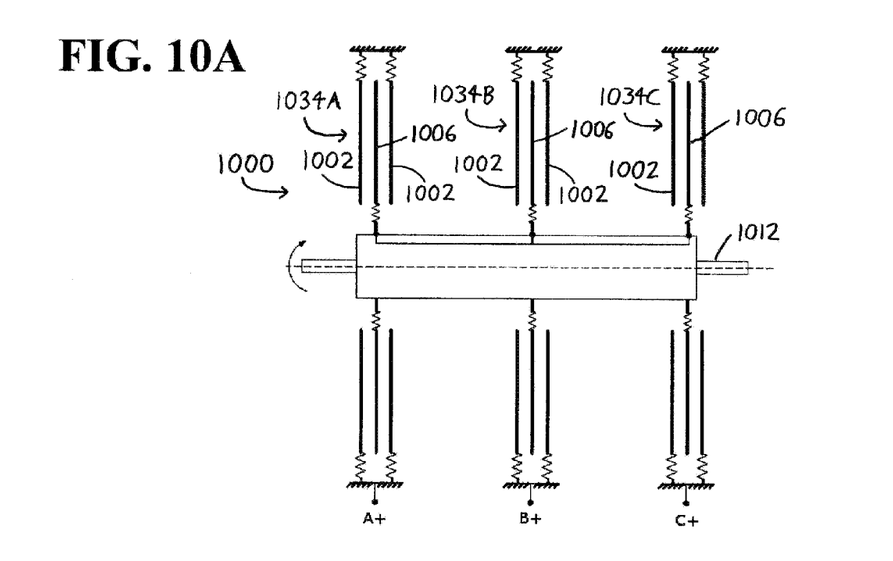
FIG. 10A provides a simplified schematic cross-sectional view of an exemplary capacitive machine 1000 having three sets 1034A, 1034B, and 1034C of stationary first plates 1002 and rotating second plates 1006, with FIG. 10B then providing a simplified circuit diagram of the machine 1000.
Figure 10B:
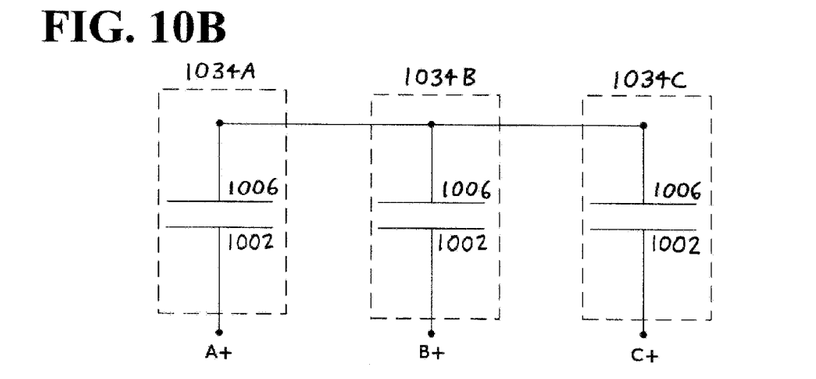

FIGS. 10A and 10B illustrate an alternative arrangement for brushless torque generation and/or multi-phase operation. Here each plate set 1034A, 1034B, and 1034C of a capacitive machine 1000 has a lead (labeled A+, B+, and C+) in conductive communication with the stationary first (stator) plates 1002 within the set, wherein the first plates 1002 within each set are connected in conductive communication with each other. All sets 1034A, 1034B, and 1034C have their rotating second (rotor) plates 1006 connected in conductive communication with each other. Again, when differently-phased charge sources are connected to each set's leads A+, B+, and C+, the set's rotating second plates 1006 are driven to rotate with respect to the stationary first plates 1002 within the sets, resulting in rotation of the actuator shaft 1012 without the need for any brushed connection to the shaft 1012.

Figure 11A:
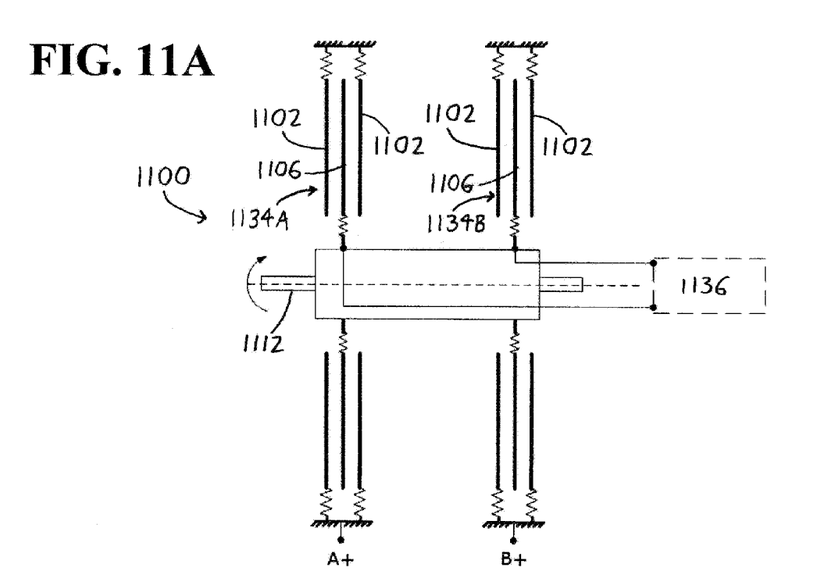
FIG. 11A provides a simplified schematic cross-sectional view of an exemplary capacitive machine 1100 having two sets 1134A and 1134B of stationary first plates 1102 and rotating second plates 1106, with FIG. 11B then presenting a simplified circuit diagram of the machine 1100.
Figure 11B:
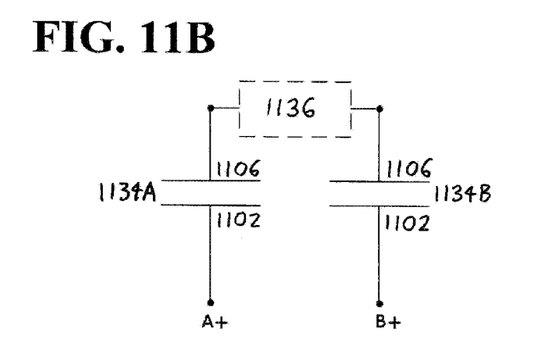

FIGS. 11A and 11B then illustrate a capacitive machine 1100 allowing transfer of electrical power and/or data between stationary first (stator) plates 1102 and rotating second (rotor) plates 1106, which are provided in two sets 1134A and 1134B. Each set 1134A and 1134B of stationary first plates 1102 is provided with a lead A+ and B+, and the rotating second plates 1106 are connected across a rotor circuit 1136 at the actuator shaft/hub 1112. Here too it should be understood that additional rotor and stator plates 1102 and 1106 might be used beyond those shown, with any additional plates being connected in parallel to those shown.

In the foregoing arrangements, it is useful to space the different plate sets from each other by a distance which is at least an order of magnitude greater than any spacings between adjacent first plate faces and second plate faces within each set (wherein "order of magnitude" is a decimal order of magnitude, i.e., the spacing between plate sets is at least ten times greater than the spacing between adjacent plates within each set). Thus, for example, if the spacings between adjacent plates within sets are on the order of micrometers, adjacent sets might be spaced at least a hundredth of a meter apart. Such an arrangement helps to avoid stray capacitance effects between plate sets, and also greatly eases the installation and maintenance of wires or other conductive communications to each set and its conductors.

Further advantages, features, and objects of the invention will be apparent from the remainder of this document in conjunction with the associated drawings.

DETAILED DESCRIPTION OF PREFERRED VERSIONS OF THE INVENTION

Expanding on the discussion begin in the "Summary of the Invention" above, preferred versions of the capacitive machines utilize two features. Initially, the machines exploit the fluid boundary layer effects that occur at the interface between a moving surface and a fluid: while in motion, the surface "drags" fluid along with it. If moving and stationary parallel plates are sufficiently close, the moving plate will effectively "pump" fluid between them, with the pressure of the fluid (which is dependent on the speed of plate motion) then helping to maintain separation between the plates. Discontinuities in the plates in the form of flexures and/or flow-modifying walls may then be provided to further assist in maintaining the walls in spaced parallel relationship (where it should be understood that the term "parallel" encompasses both literally parallel and at least substantially parallel alignments). Flexures can be situated on a capacitive machine's plates such that the plates automatically remain in parallel spaced relationship, with the assistance of fluid pressure, regardless of plate misalignment forces (from vibration, temperature-induced warping of plates, stator mounts, shafts, etc., and other factors). Moreover, the fluid pressure between plates can be adapted as desired by providing walls which interrupt, divert, or otherwise modify fluid flow to provide a desired pressure distribution between plates (at least at the machine's intended operational speed range). Using these principles, machines having micron-level plate spacings are possible, which is on the order of hundreds of times less than the spacings that are practically possible using rigidly-suspended plate systems. This results in far greater force and/or power generation capability, and/or data transmission capability, than similarly-sized capacitive machines using rigidly-mounted plates.

The fluid used in the gaps between plates may be a gas such as air, or a liquid such as oil or other liquid hydrocarbons. Cryogenic fluids (e.g., liquid oxygen) can also be used. Machines might also use different fluids at different times depending on the situation of their use, with fluids being selected for desired properties, e.g., high dielectric permittivity (which enhances capacitance), flammability, heat conductance, etc.

Various preferred versions of capacitive machines are shown and described above to illustrate different possible features of the invention and the varying ways in which these features may be combined. Apart from combining the different features of the foregoing versions in varying ways—for example, any one or more of flexures, walls, and/or channels may be added to versions of the capacitive machines which are not shown or described as including these features—other modifications are also considered to be within the scope of the invention. Following is an exemplary list of such modifications.

While the illustrated examples depict planar plates of similar size and configuration, plates need not necessarily be planar, nor must they have the same size/configuration. Non-planar plates with complementary shapes, with the plates being closely spaced in at least substantially parallel alignment, might be used instead. See, for example, the semi-cylindrical plates shown in U.S. Patent Appl'n. Publ'ns. 2013/0043762 and 2013/0106317, the contents of which are hereby incorporated by reference such that their contents should be regarded as a part of this document. Moreover, moving plates need not have the same size and shape as their corresponding stationary plates; for example, a circular rotating plate might be situated adjacent a square stationary plate of greater size, or a translating plate may have a small area which travels along a stationary plate defining a long track.

While translational capacitive machines have been illustrated using only a pair of plates, here too greater numbers of plates, and/or sets of plates, might be used to provide greater capacitance (and thus greater power/force density, and/or data transmission ability). Stationary plates might have stator mounts which fix them into parallel spaced relation, with one or more linear actuators bearing moving plates which translate between the stationary plates.

When it is said that one plate is stationary and the other is in motion, this should be understood to mean relative motion, i.e., when viewed externally, one of the plates may be stationary and the other may be moving, or alternatively both plates may be moving such that from the frame of reference of one of the plates, that plate is stationary while the other is moving. Stated simply, capacitive machines may operate with both plates in a coupled pair translating or rotating, so long as one plate moves relative to the other. It is also possible that one or both plates in a coupled pair may have both translational and rotational motion (i.e., travel paths may be more complex than linear or circular ones).

While the use of plates bearing pressure-modifying discontinuities, such as walls and channels, has been discussed in relation to rotational capacitive machines, these and other discontinuities can be used in translational capacitive machines as well. For example, in FIG. 2A, a downwardly-descending wall might be situated at the end of the stationary first plate 202A (at the far right-hand end of the plate 202A in FIG. 2A) to provide an arrangement analogous to that of FIG. 3. As another example, the insulating sections 530 in FIGS. 5A-5B might be raised above the second plate face 508, with the conducting sections 532 thereby defining channels in the second plate face 508, such that the raised insulating sections 530 assist in "pumping" fluid into the gap 510 as they move adjacent the stationary first plate 502 at the far left-hand end of the plate 502. As with rotational capacitive machines, other types of discontinuities may additionally or alternatively be used, with the discontinuities being designed to attain desired fluid flow and pressure effects.

Flow-directing channels such as the channels 222B in the stationary plate 202B of the capacitive machine 200B of FIG. 2B, and the channels 622 in the stationary plate 602 of the capacitive machine 600 of FIG. 6, can be provided on rotating plates in addition to, or instead of, on stationary plates (though channels on stationary plates is typically preferred for ease of manufacture). As seen in the exemplary plate 402 of FIG. 4, the widths of channels 422 may vary as they extend in radial directions, which can be useful to modify the intra-plate pressure as desired (since pressure is typically not radially uniform). Channels need not extend continuously along the radii of the plates—for example, they might be interrupted by annular walls, as in the capacitive machine 300 of FIG. 3—and they need not have arcuate lengths/segments as in FIGS. 2B, 4, and 6 (e.g., straight or other lengths/segments might be used depending on the pressure effects desired). Channels also need not correspond to either conducting or insulating material (i.e., the channels need not have floors of one of the materials and be bounded by the other of the materials), and might extend over both insulating and conducting areas.

While flexure regions are preferably formed as rows of multiple slits, with the lengths of the slits being staggered between rows (similar to the arrangement used in wave springs), flexure regions could assume other forms, such as sets of strategically-shaped voids having other shapes (e.g., regions having a mesh-like form), and/or thinned areas along plates which effectively define leaf springs, living hinges, or semi-rigid folded areas (e.g., an accordion fold which is sufficiently stiff that it resists buckling, but allows flexure). Flexure regions might also be defined as the junctures between plates and their supports, e.g., as springs fixing stationary plates to their stator mounts, or as springs situated between rotating plates and their actuator shafts. Such springs may assume a variety of forms, e.g., coil springs, wave springs, leaf springs, elastomeric springs, etc.

While the foregoing discussion has largely focused on the use of flexures in rotational capacitive machines, flexures may be (and preferably are) used in translational capacitive machines as well. As an example, in the capacitive machine 200A of FIG. 2A, a flexure region 214A might be situated on the stationary first plate 202A to allow it to deflect into closely spaced parallel relation to the second plate 206A. In similar respects, in FIGS. 5A and 5B, a flexure region 514 might be provided on the stationary first plate 502. Depending on the structure and usage of the capacitive machines 200A and 500, flexures might support opposite ends, different sides, or different portions of the perimeters of the plates 202A and 502.

While various versions of rotational capacitive machines are illustrated as including flexure regions on both their stationary and rotating plates (which is the preferred arrangement), flexure regions could instead be included on only the stationary plates, only the rotating plates, or on selected ones of both stationary and rotating plates. In similar respects, translational capacitive machines may include flexures on either or both of stationary and translating plates.

In salient versions of the rotational capacitive machines, sets of alternating conducting and insulating sections can be provided radially as well as circumferentially; for example, plates might include annular inner and outer sets of circumferentially alternating conducting and insulating sections, wherein the inner and outer sets are not in communication. Such arrangements can allow combination of the features discussed with respect to the capacitive machines 900, 1000, and 1100. It should be understood that a machine's saliency characteristics may vary depending on the form of the insulating and conducting sections used, and the relative motion between coupled plates. For example, the saliency diagram of FIG. 8 could, with appropriately configured insulating and conducting sections and/or appropriate relative motion between plates, depict sinusoidal rather than triangular position-dependent variance in capacitance.

Figure 9D:
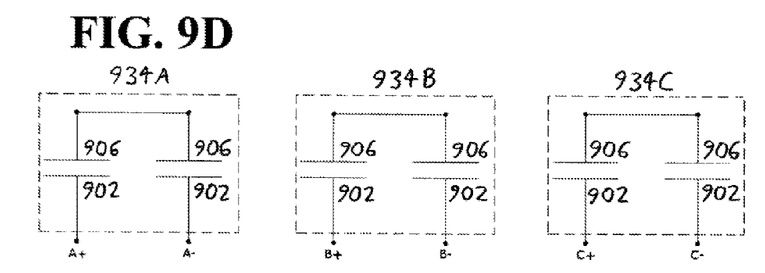
FIG. 9D providing a simplified circuit diagram of the machine 900.

The brushless and/or multiphase arrangements of FIGS. 9A-9D and 10A-10B are merely exemplary, and other brushless and/or multiphase arrangements are possible. Consider that FIG. 9C illustrates a single-phase machine wherein two separate sets of stationary plates 902 (defining the positive and negative connections to the machine) interact with electrically connected rotating plates 906 on a common actuator shaft 912. This configuration avoids the need for a moving/sliding ("brushed") electrical connection to the rotor 912. FIGS. 9A and 9D then contemplate use of several of this single-phase plate set (preferably with a common actuator shaft 912 between the sets), with the phases of the sets 934A, 934B, and 934C being staggered to provide a multi-phase arrangement. Alternatively, the sets 934A, 934B, and 934C might have the same phase, if a single-phase arrangement was desired (with power and/or torque output increasing as the numbers of the sets increase). Alternatively or additionally, power and/or torque output might be increased by providing one or more additional stationary plates 902 in parallel with each of the positive and negative sets of stationary plates 902, and providing a corresponding number of rotating plates 906 in parallel with each of the depicted rotating plates 906 (i.e., one on each of the positive and negative sides, to rotate between the additional stationary plates 902 and those depicted). In FIG. 10A, only a single rotating plate 1006 is used in each (differently-phased) plate set 1034A, 1034B, and 1034C, with all rotating plates 1006 being electrically connected. Here too additional rotor and stator plates 1002 and 1006 might be used beyond those shown, with any additional plates being connected in parallel to those shown, or additional plate sets might be added. While it is contemplated that the plate sets 1034A, 1034B, and 1034C each offer a different phase for three-phase operation (and that additional sets, if used, might provide additional phases), different plate sets could instead have the same phase, if desired.

Other possible variations of the capacitive machines described herein involve incorporating the capacitive machines into the arrangements described in the aforementioned U.S. Patent Appl'n. Publ'ns. 2013/0043762 and 2013/0106317, or incorporating features of the capacitive machines described in those documents into the capacitive machines described above.

Since the versions of the machines described above are merely exemplary, the invention is not intended to be limited to these versions. Rather, the scope of rights in the machines is limited only by the claims set out below, and the protected invention encompasses all different versions that fall literally or equivalently within the scope of these claims.

What is claimed is:

1. A capacitive machine:
   a. including:
      (1) a first plate having a first plate face,
      (2) a second plate having a second plate face:
         (a) closely spaced opposite the first plate face, and
         (b) oriented at least substantially parallel to the first plate face,
      with the first and second plate faces having fluid therebetween,
   b. wherein:
      (1) at least one of the plates is movable with respect to the other along a travel direction, wherein such motion causes flow of the fluid between the plates,
      (2) at least one of the plates has discontinuities in the relief of its plate face, each discontinuity defining at least one of:
         (a) a flexure region having greater flexibility than regions of the plate outside the flexure region, wherein the plate is more easily deflected at the flexure region along directions oriented generally perpendicularly with respect to the travel direction, and
         (b) a wall situated to obstruct fluid flowing between the plates due to plate motion.

2. The capacitive machine of claim 1 wherein at least one of the plates has discontinuities defining elongated channels in its plate face, the channels each being bounded by opposing channel walls.

3. The capacitive machine of claim 2 wherein:
   a. at least one of the plates is rotatable with respect to the other of the plates along a circular travel direction, and
   b. the channels extend radially outwardly with respect to an axis about which the rotation occurs.

4. The capacitive machine of claim 3 wherein the channels extend in one of a clockwise or counterclockwise direction as they extend radially outwardly.

5. The capacitive machine of claim 3 wherein at least one of the channels includes:
   a. a first channel section extending in a clockwise direction as the first channel section extends radially outwardly, and
   b. a second channel section extending in a counterclockwise direction as the second channel section extends radially outwardly.

6. The capacitive machine of claim 3 wherein at least one of the plates having discontinuities has one or more discontinuities defining a wall extending in a circumferential direction, whereby fluid flowing radially outwardly between the plates due to plate motion is obstructed by the wall.

7. The capacitive machine of claim 6 wherein the wall defines an annular ring about the axis about which the rotation occurs.

8. The capacitive machine of claim 2 wherein at least one of the plates having discontinuities defining channels in its plate face is defined by:
   a. conductive material at one of the:
      (1) regions of the plate adjacent the channels, and
      (2) regions of the plate between the channels; and
   b. insulating material at the other of the:
      (1) regions of the plate adjacent the channels, and
      (2) regions of the plate between the channels.

9. The capacitive machine of claim 1 wherein:
   a. at least one of the plate faces has insulating sections spaced by conducting sections, and
   b. the insulating and conducting sections are arrayed along the travel direction.

10. The capacitive machine of claim 9 wherein one or more of the plate faces has insulating sections protruding from the plate face, whereby the insulating sections are raised above the conducting sections.

11. The capacitive machine of claim 9 wherein:
    a. the first plate face has insulating sections spaced by conducting sections along the travel direction, wherein one of the insulating and conducting sections on the first plate face is raised above the other of the sections, and
    b. The second plate face also has insulating sections spaced by conducting sections along the travel direction, wherein the insulating and conducting sections on the second plate face together define an at least substantially planar surface.

12. The capacitive machine of claim 11 wherein:
    a. the first plate:
       (1) is rotatable with respect to the second plate,
       (2) has slits defined therein, the slits being:
          (a) radially spaced,
          (b) aligned at least substantially parallel to each other, and
          (c) situated radially closer to the axis of rotation of the first plate than to an outer circumference of the first plate,
          the slits thereby defining a first plate flexure region having greater flexibility than a region of the first plate outside the first plate flexure region,
    b. the second plate:
       (1) is fixed at a stator mount to remain stationary,
       (2) has slits defined therein, the slits being:
          (a) radially spaced,
          (b) aligned at least substantially parallel to each other, and
          (c) situated radially closer to the stator mount than to the axis of rotation of the first plate,
          the slits thereby defining a second plate flexure region having greater flexibility than a region of the second plate outside the second plate flexure region.

13. The capacitive machine of claim 1 having two or more sets of first and second plates, wherein:
    a. the first plates of each set:
       (1) are fixed in position with respect to each other,
       (2) have first plate faces with insulating sections spaced along the travel direction by conducting sections, and
       (3) have their conducting sections connected in conductive communication with each other,
    b. the second plates of each set:
       (1) are fixed in position with respect to each other,
       (2) have second plate faces with insulating sections spaced along the travel direction by conducting sections, and
       (3) have their conducting sections connected in conductive communication with each other,
    c. the second plates of all sets:
       (1) are fixed in position with respect to each other, and
       (2) are movable with respect to the first plates of the sets along the travel direction, such that:
          (a) the conducting sections of each set's first and second plates, and
          (b) the insulating sections of each set's first and second plates,
          periodically move into alignment during motion of the first plates of the sets,
    d. during motion of the second plates of the sets, different sets achieve such alignment of their conducting and insulating sections at different times.

14. The capacitive machine of claim 1 having two or more sets of first and second plates, wherein:
    a. the first plates of each set:
       (1) are fixed in position with respect to each other, and
       (2) have first plate faces with insulating sections spaced along the travel direction by conducting sections,
    b. the second plates of each set:
       (1) are fixed in position with respect to each other, and
       (2) have second plate faces with insulating sections spaced along the travel direction by conducting sections,
    c. the second plates of all sets:
       (1) are fixed in position with respect to each other, and
       (2) are movable with respect to the first plates of the sets along the travel direction, such that:
          (a) the conducting sections of each set's first and second plates, and
          (b) the insulating sections of each set's first and second plates,
          periodically move into alignment during motion of the second plates of the sets,
    d. the sets are spaced from each other by a distance which is at least an order of magnitude greater than any spacings between adjacent first plate faces and second plate faces within each set.

15. The capacitive machine of claim 14 wherein during motion of the second plates of the sets, different sets achieve alignment of their conducting sections at different times.

16. The capacitive machine of claim 1 having two or more sets of first and second plates, each set containing one or more first plates and two or more second plates, wherein:

a. the first plates of each set:
   (1) are fixed in position with respect to each other, and
   (2) have first plate faces with insulating sections spaced along the travel direction by conducting sections,
b. the second plates of each set:
   (1) are fixed in position with respect to each other,
   (2) have second plate faces with insulating sections spaced along the travel direction by conducting sections, and
   (3) are movable along the travel direction with respect to the first plates within the set, such that:
      (a) the conducting sections of each set's first and second plates, and
      (b) the insulating sections of each set's first and second plates,
      periodically move into alignment during motion of the second plates of the sets;
c. each set has a pair of leads wherein each lead within the pair is in conductive communication with one or more of the first plates within the set;
d. application of opposing charges to the leads of each set drives the second plates of the sets to move along the travel directions with respect to the first plates within the sets.

17. The capacitive machine of claim 1 having two or more sets of first and second plates wherein:
a. the first plates of each set:
   (1) are fixed in position with respect to each other,
   (2) are in conductive communication with each other, and
   (3) have first plate faces with insulating sections spaced along the travel direction by conducting sections,
b. the second plates of each set:
   (1) are fixed in position with respect to each other,
   (2) are in conductive communication with each other, and
   (3) have second plate faces with insulating sections spaced along the travel direction by conducting sections, and
      (3) are movable along the travel direction with respect to the first plates within the set, such that:
      (a) the conducting sections of each set's first and second plates, and
      (b) the insulating sections of each set's first and second plates,
      periodically move into alignment during motion of the second plates of the sets, and
c. each set has a lead in conductive communication with at least one of the first plates within the set;
d. application of different charges to the leads of the different sets drives the second plates of the sets to move along the travel directions with respect to the first plates within the sets.

18. The capacitive machine of claim 1 wherein:
a. at least one of the first and second plates has slits defined therein,
b. each plate bearing the slits has the slits:
   (1) closely spaced in at least substantially parallel relation to each other on the plate, and
   (2) defining a flexure region having greater flexibility than regions of the plate outside the flexure region, such that at the flexure region, the plate is more easily deflected in directions oriented generally perpendicular to the slits.

19. The capacitive machine of claim 18 wherein:
a. the first plate is driven by an actuator to move with respect to the second plate,
b. the second plate is fixed to remain stationary, and
c. the flexure region is situated on the first plate adjacent to the actuator.

20. The capacitive machine of claim 19 wherein:
a. the actuator is defined by a shaft, and
b. the first plate rotates on the shaft with respect to the second plate.

21. The capacitive machine of claim 18 wherein:
a. the first plate is rotatable about a shaft extending through the second plate,
b. the second plate:
   (1) extends from a stator mount, wherein the stator mount fixes the second plate to remain stationary, and
   (2) bears the flexure region adjacent to the stator mount.

22. A capacitive machine:
a. including:
   (1) a first plate having a first plate face, and
   (2) a second plate:
      (a) having a second plate face oriented at least substantially parallel to the first plate face,
      (b) constrained to move along a travel direction with respect to the first plate,
b. wherein:
   (1) the first and second plate faces have fluid therebetween, wherein motion of the second plate drives the fluid to flow between the plates,
   (2) at least one of the plate faces has a wall thereon, wherein the wall is situated to obstruct fluid driven to flow between the plates by the motion of the second plate.

23. A capacitive machine:
a. including:
   (1) a first plate having a first plate face,
   (2) a second plate having a second plate face:
      (a) closely spaced opposite, and
      (b) oriented at least substantially parallel to,
      the first plate face,
b. wherein:
   (1) at least one of the first and second plates is movable with respect to the other of the plates along a travel direction,
   (2) at least one of the first and second plates has slits defined therein, wherein each plate bearing slits has its slits:
      (a) closely spaced to each other on the plate in at least substantially parallel relation, and
      (b) defining a flexure region having greater flexibility than a region of the plate outside the flexure region, such that at the flexure region, the plate is more easily deflected in directions oriented generally perpendicular to the slits.

* * * * *